United States Patent
Wang

(10) Patent No.: US 9,156,410 B2
(45) Date of Patent: Oct. 13, 2015

(54) ROOF-RACK MECHANISM FOR AUTOMOBILE

(71) Applicant: Beto Engineering & Marketing Co., Ltd., Taichung (TW)

(72) Inventor: Lo Pin Wang, Taichung (TW)

(73) Assignee: Beto Entineering & Marketing Co., Ltd., Beitun, Tiachung (TW)

( * ) Notice: Subject to any disclaimer, the term of this patent is extended or adjusted under 35 U.S.C. 154(b) by 182 days.

(21) Appl. No.: 13/972,051

(22) Filed: Aug. 21, 2013

(65) Prior Publication Data
US 2015/0053732 A1  Feb. 26, 2015

(51) Int. Cl.
*B60R 9/045* (2006.01)
*B60R 9/048* (2006.01)
*B60R 9/08* (2006.01)

(52) U.S. Cl.
CPC ............... *B60R 9/045* (2013.01); *B60R 9/048* (2013.01); *B60R 9/08* (2013.01)

(58) Field of Classification Search
CPC .......... B60R 9/045; B60R 9/048; B60R 9/08; B60R 9/10; B60R 9/12
See application file for complete search history.

(56) References Cited

U.S. PATENT DOCUMENTS

| | | | |
|---|---|---|---|
| 3,719,297 A * | 3/1973 | Nowicki | 414/462 |
| 4,261,496 A * | 4/1981 | Mareydt et al. | 224/315 |
| 4,312,467 A * | 1/1982 | Kulwin | 224/315 |
| 4,735,350 A | 4/1988 | Kamaya | |
| 4,747,528 A | 5/1988 | Kamaya | |
| 5,071,050 A * | 12/1991 | Pudney et al. | 224/321 |
| 5,137,195 A * | 8/1992 | Walter | 224/315 |
| 5,160,075 A * | 11/1992 | Moscovitch | 224/328 |
| 5,511,708 A * | 4/1996 | Cronce et al. | 224/321 |
| 5,516,017 A * | 5/1996 | Arvidsson | 224/310 |
| 5,738,258 A * | 4/1998 | Farrow et al. | 224/324 |
| 5,951,231 A * | 9/1999 | Allen | 414/462 |
| D434,364 S * | 11/2000 | Bauer et al. | D12/412 |
| 6,561,397 B1* | 5/2003 | Bauer et al. | 224/316 |
| 6,561,398 B1* | 5/2003 | Cole et al. | 224/324 |
| 6,622,898 B1* | 9/2003 | Wang | 224/321 |
| 6,705,822 B2 | 3/2004 | Oldak | |
| 6,817,500 B2 | 11/2004 | Neaux | |
| 7,726,528 B2* | 6/2010 | Foley | 224/324 |
| 7,815,083 B2* | 10/2010 | Clausen et al. | 224/501 |
| 8,016,172 B1* | 9/2011 | Mefford | 224/321 |
| 2006/0060621 A1* | 3/2006 | Klinkman et al. | 224/321 |
| 2007/0119887 A1* | 5/2007 | Foley | 224/324 |
| 2008/0035689 A1* | 2/2008 | Murray et al. | 224/310 |
| 2009/0120981 A1* | 5/2009 | Sautter et al. | 224/316 |
| 2009/0120982 A1* | 5/2009 | Sautter et al. | 224/323 |
| 2011/0132946 A1* | 6/2011 | Sautter et al. | 224/324 |
| 2013/0284779 A1* | 10/2013 | Sautter et al. | 224/323 |
| 2014/0143990 A1* | 5/2014 | Sautter et al. | 24/68 CD |

* cited by examiner

*Primary Examiner* — Brian D Nash
(74) *Attorney, Agent, or Firm* — Charles E. Baxley

(57) ABSTRACT

A roof-rack mechanism includes one or more retaining devices attached to a track, and a lock device engaged with the track and the retaining device for detachably attaching the retaining device to the track. The retaining device includes a base member, and a bracket attached to the base member and mounted on the track. The bracket includes a recess formed between two legs for engaging with the track, and the lock device is engaged with the track and the legs of the bracket. The retaining device includes two flaps engaged onto the legs of the bracket and secured to the legs and the track with the lock device. The retaining device includes a cover pivotally attached to the base member with a coupler.

18 Claims, 10 Drawing Sheets

ROOF-RACK MECHANISM FOR AUTOMOBILE

BACKGROUND OF THE INVENTION

1. Field of the Invention

The present invention relates to a roof-rack mechanism for an automobile vehicle or the like, and more particularly to a roof-rack mechanism for an automobile vehicle including an improved structure or configuration for solidly and stably and safely attaching or mounting or securing or supporting various objects or loads onto the roof of the automobile vehicle or the like and for preventing the objects or loads from being hurt or damaged when carried with the automobile vehicle.

2. Description of the Prior Art

Typical roof-rack mechanisms or loader systems or cargo carrying or supporting structures or configurations comprise a pair of rails or racks attached or mounted or secured on top of the roof of the automobile vehicle for detachably or removably attaching or mounting or securing various objects or loads or cargo members onto the roof of the automobile vehicle, and for allowing the objects or loads or cargo members moved or carried with the automobile vehicle.

For example, U.S. Pat. No. 4,735,350 to Kamaya, U.S. Pat. No. 4,747,528 to Kamaya, U.S. Pat. No. 6,705,822 to Oldak, and U.S. Pat. No. 6,817,500 to Neaux disclose several of the typical roof-rack mechanisms or loader systems or cargo carrying or supporting structures or configurations each also comprising a pair of rails or racks attached or mounted or secured on top of the roof of the automobile vehicle for detachably or removably attaching or mounting or securing various objects or loads or cargo members onto the roof of the automobile vehicle, and for preventing the objects or loads from falling off the automobile vehicle.

However, the rails or racks are normally attached or mounted or secured on top of the roof of the automobile vehicle and parallel to each other, but may not be used for solidly and stably and suitably attaching or mounting or securing larger objects or loads or cargo members onto the roof of the automobile vehicle, such as kayak, canoe, surfing boards or the like.

The present invention has arisen to mitigate and/or obviate the afore-described disadvantages of the conventional roof-rack mechanisms.

SUMMARY OF THE INVENTION

The primary objective of the present invention is to provide a roof-rack mechanism for an automobile vehicle including an improved structure or configuration for solidly and stably and safely attaching or mounting or securing or supporting various objects or loads onto the roof of the automobile vehicle or the like and for preventing the objects or loads from being hurt or damaged when carried with the automobile vehicle.

In accordance with one aspect of the invention, there is provided a roof-rack mechanism comprising at least one track, at least one retaining device attached to the track, and a lock device engaged with the track and the retaining device for detachably attaching the retaining device to the track and for solidly attaching various cargo members to the track.

The retaining device includes a base member, and a bracket attached to the base member and mounted on the track. The bracket includes a recess formed between two legs for engaging with the track, and the lock device is engaged with the track and the legs of the bracket.

The retaining device includes two flaps engaged onto the legs of the bracket and secured to the legs and the track with the lock device. The retaining device includes a bar engaged between the base member and the bracket.

The retaining device includes a cover pivotally attached to the base member with a coupler. The coupler includes two arms attached to the base member and the cover respectively and pivotally coupled together with a pivot axle for allowing the cover to be rotated relative to the base member.

The coupler includes a spring biasing member engaged onto the pivot axle and engaged with the arms for biasing the cover away from the base member. The coupler includes two housings attached to the base member and the cover and engaged onto the arms for shielding the arms respectively.

The retaining device includes a latch device for latching the base member and the cover together at a working position. The latch device includes a securement plate attached to the cover, and an actuating lever pivotally secured to the base member with a pivot shaft, and the actuating lever includes a latch tongue for selectively engaging with the securement plate of the cover and for locking the cover to the base member.

The actuating lever includes a hand grip for moving the latch tongue of the actuating lever from the securement plate of the cover. The securement plate includes a lock opening formed therein and defined by an anchoring element for selectively engaging with the latch tongue of the actuating lever.

The latch device includes a cap attached to the securement plate and the cover, and a lock element rotatably engaged in the cap for engaging with the actuating lever and for locking the latch tongue of the actuating lever in engagement with the securement plate of the cover.

The actuating lever includes a notch formed therein, and the lock element includes an anchor having a first side and a second side, the first side of the anchor includes a length greater than a width of the notch of the actuating lever for preventing the anchor from engaging through the notch of the actuating lever, and the second side of the anchor includes a length no greater than the width of the notch of the actuating lever for allowing the anchor to be engaged through the notch of the actuating lever.

The lock element includes an engaging slit formed therein. The latch device includes a casing attached to the base member for shielding the actuating lever. The track includes at least one fastening strap.

The latch device includes a spring biasing member attached onto the pivot shaft and engaged between the base member and the actuating lever for biasing the latch tongue of the actuating lever to engage with the securement plate of the cover.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 8:
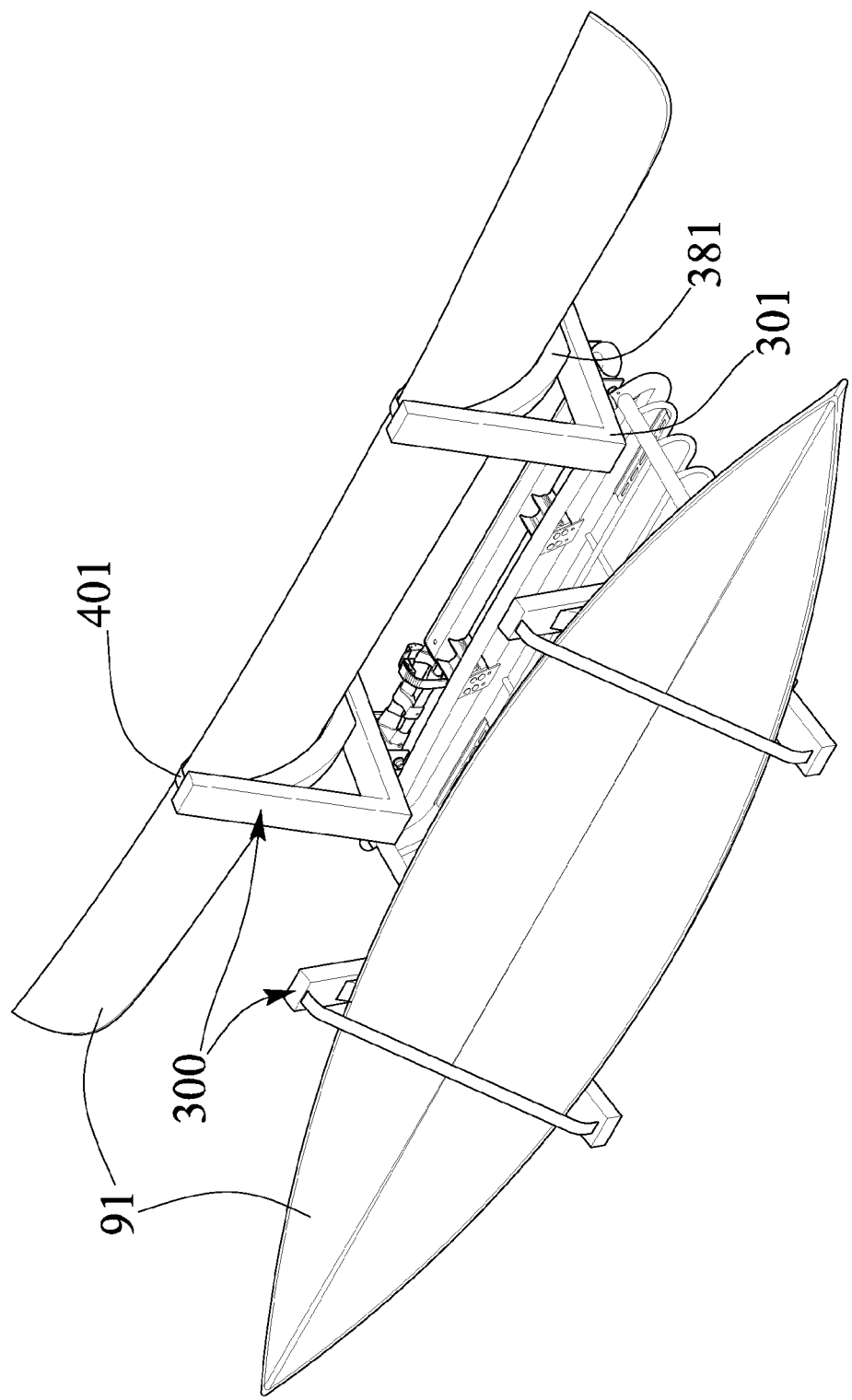
FIG. 8 is a still further perspective view similar to FIG. 7, illustrating the operation of the roof-rack mechanism as shown in FIG. 7.
Figure 9:
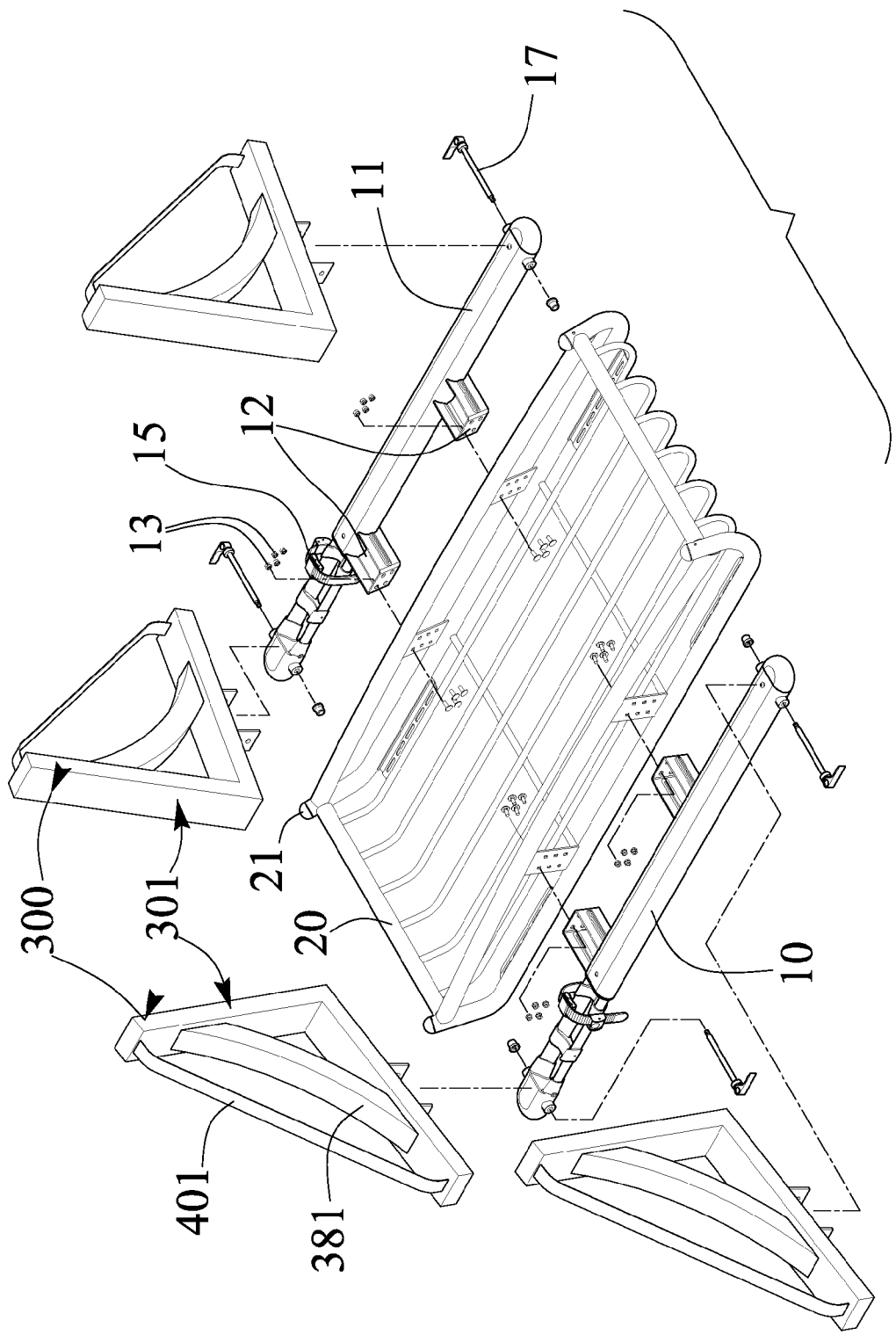
FIG. 9 is a partial exploded view of the roof-rack mechanism as shown in FIGS. 7 and 8.
Figure 10:
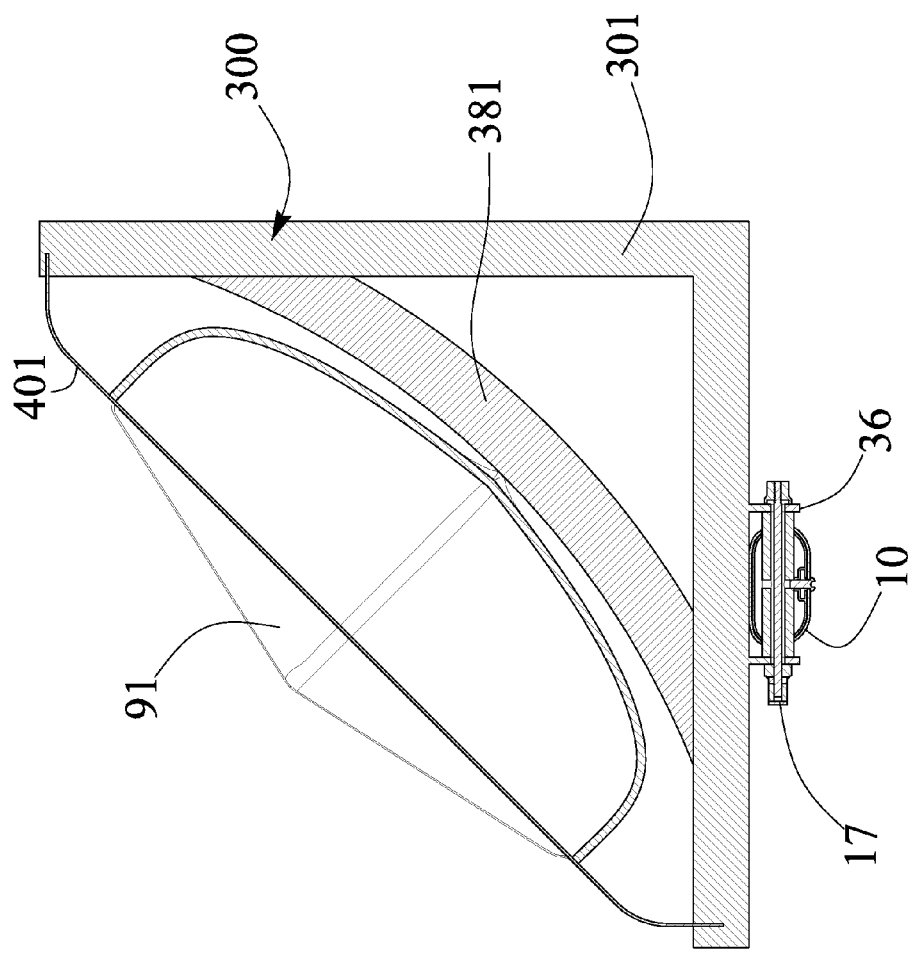
FIG. 10 is a cross sectional view of the roof-rack mechanism, taken along lines 10-10 of FIG. 7.

Referring to the drawings, and initially to FIGS. 1-5, a roof-rack mechanism in accordance with the present invention comprises one or more (such as two) rails or tracks 10, 11 to be disposed or attached or mounted or secured on top of the roof of the automobile vehicle (not illustrated) for detachably or removably attaching or mounting or securing various objects or loads or cargo members 90, such as skating board, skiing board, surfing board 90 (FIGS. 2, 5-6), kayak or canoe 91 (FIGS. 8, 10), or the like, onto the roof of the automobile vehicle (not illustrated), and for allowing the objects or loads or cargo members 90, 91 to be solidly and stably and safely and suitably moved or carried with the automobile vehicle. The engagement or mechanism or attachment of the tracks 10, 11 to top of the roof of the automobile vehicle is typical and is not related to the present invention and will not be described in further details.

The tracks 10, 11 each include one or more (such as two) extensions or protrusions or projections 12 extended laterally and outwardly therefrom, for example, the projections 12 of the two spaced and parallel and different tracks 10, 11 are faced or directed toward each other, or the projections 12 of one of the tracks 10, 11 are faced or directed toward the other track 11, 10. A casing or receptacle or carrier or basket 20 is disposed and located between the tracks 10, 11, and includes two side portions 21 each having one or more (such as two) panels or flaps or plates or anchors or seats 22 aligned and engaged with the projections 12 of the tracks 10, 11 respectively and attached or mounted or secured to the projections 12 or the tracks 10, 11 with screws or bolts or catches or latches or fasteners 13 or the like. The tracks 10, 11 each include one or more fastening belts or straps 15 for detachably or removably attaching or mounting or securing the cargo members 90, 91 to the track 10, 11 respectively.

The roof-rack mechanism further comprises one or more (such as two) clamping or anchoring or positioning or carrying or retaining devices 3 attached or mounted or secured to each of the tracks 10, 11, or relatively, the tracks 10, 11 each include one or more (such as two) retaining devices 3 attached thereto for clamping or anchoring or positioning or carrying or retaining the objects or loads or cargo members 90, 91 to the tracks 10, 11 and the roof of the automobile vehicle. The retaining devices 3 each include a lower stationary base member 30 having a bracket 31 attached or mounted or secured to the bottom portion of the lower stationary base member 30 for attaching or mounting or securing or coupling to the tracks 10, 11. For example, the bracket 31 includes a depression or notch or recess 32 formed therein and formed or defined between two legs 33 for receiving or engaging with the track 10, 11 respectively.

Figure 4:
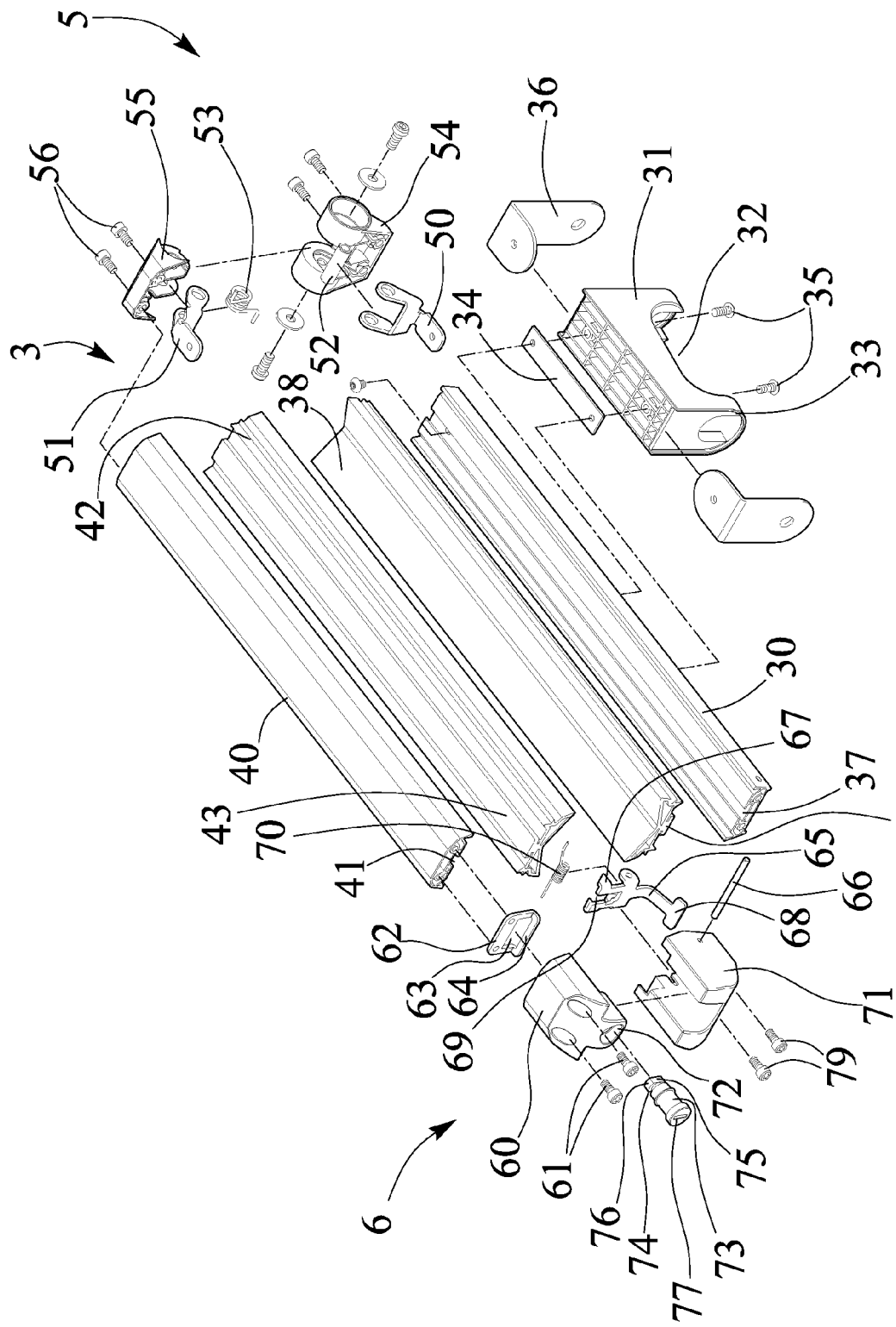
FIG. 4 is another partial exploded view of the roof-rack mechanism.
Figure 5:
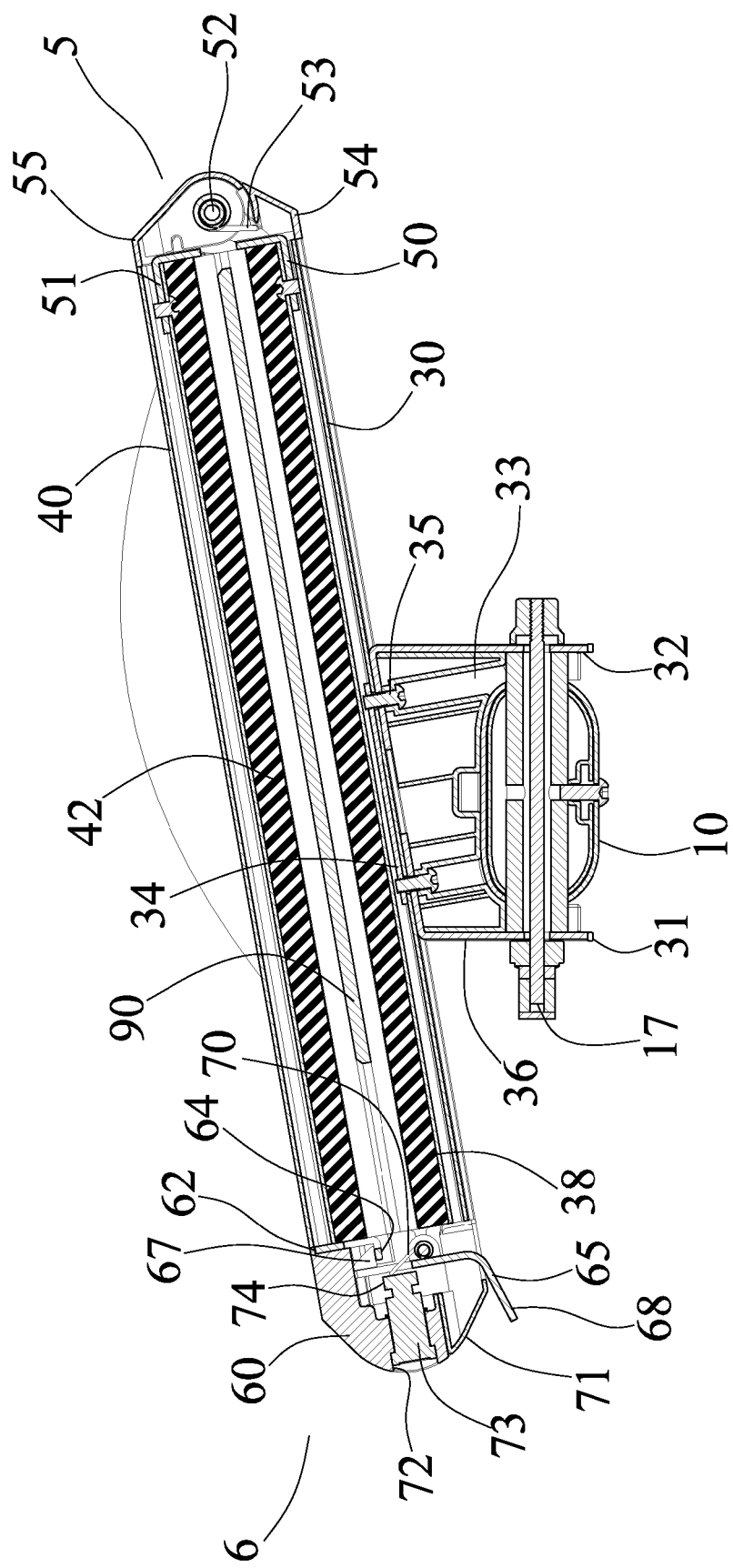
FIG. 5 is a cross sectional view of the roof-rack mechanism, taken along lines 5-5 of FIG. 1.
Figure 6:
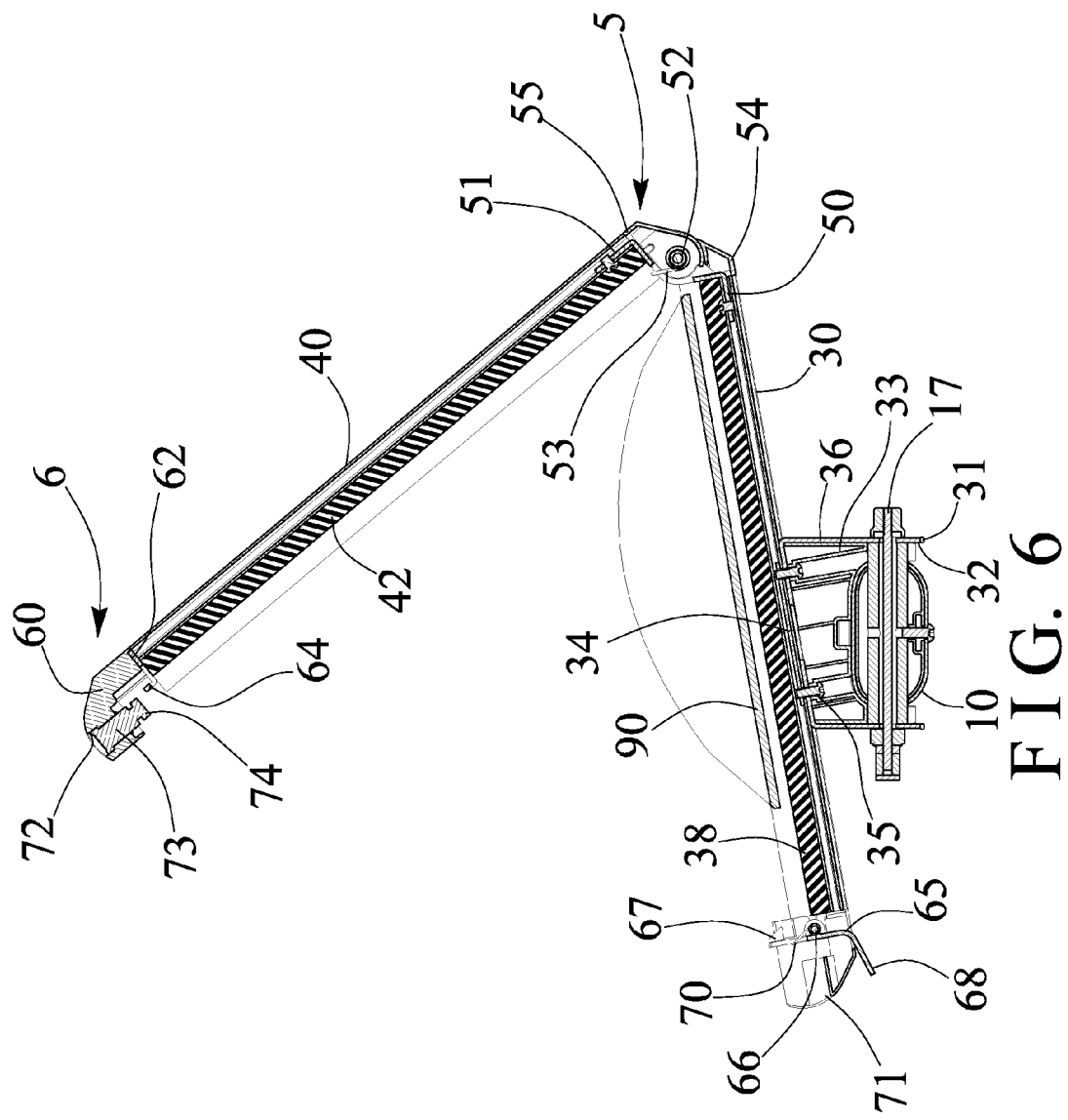
FIG. 6 is another cross sectional view similar to FIG. 5, illustrating the operation of the roof-rack mechanism.
Figure 7:
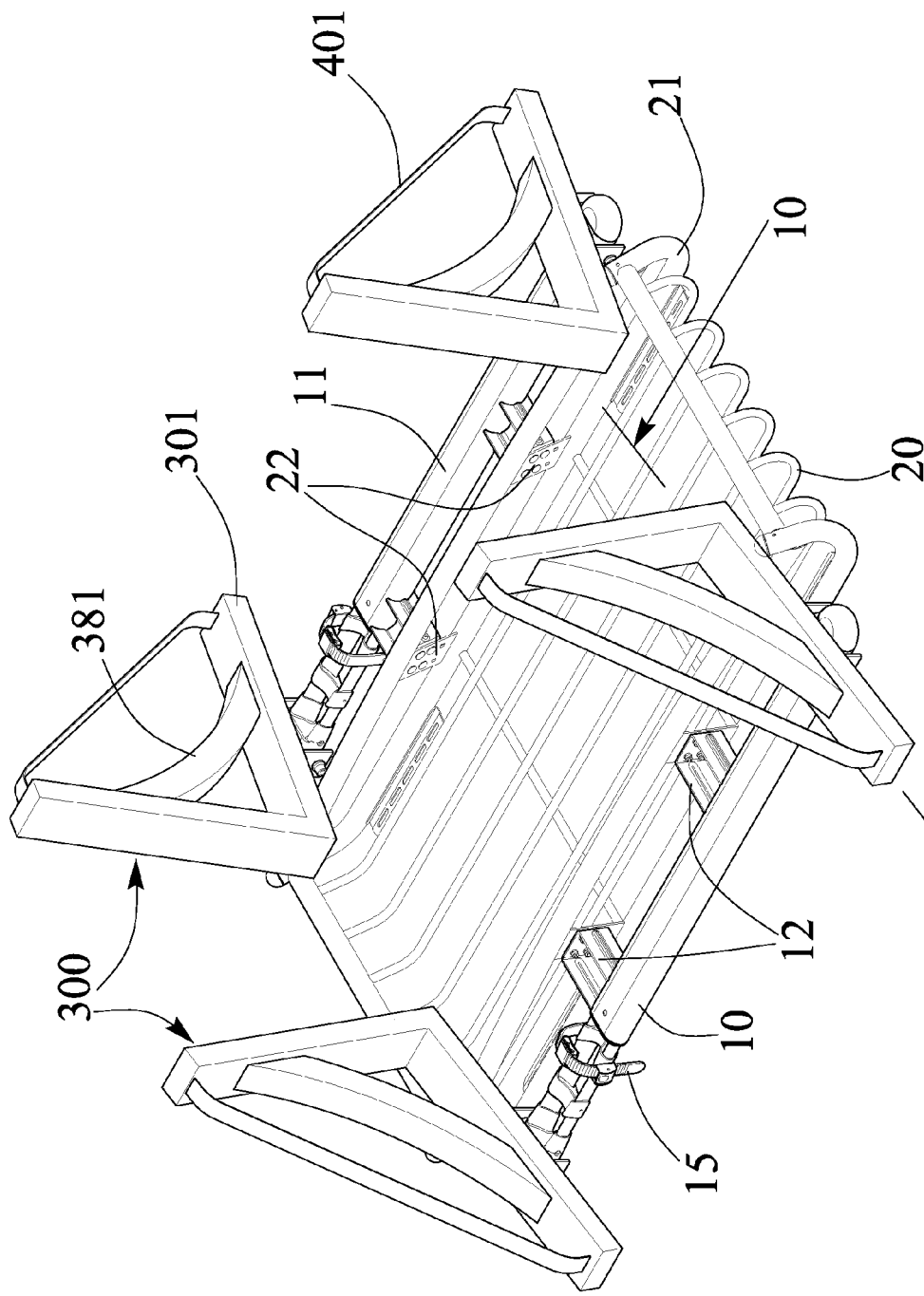
FIG. 7 is a further perspective view similar to FIG. 1, illustrating the other arrangement of the roof-rack mechanism.

As best shown in FIGS. 4-6, the retaining device 3 includes a strip or board or panel or flap or plate or bar 34 disposed or engaged between the base member 30 and the bracket 31, and the bar 34 and the bracket 31 are attached or mounted or secured to the base member 30 with screws or bolts or catches or latches or fasteners 35 or the like. One or more (such as two) flaps or plates or bars or strips or panels or angles or flaps 36 may further be provided and attached or mounted or secured or engaged onto the side portions or the legs 33 of the bracket 31 respectively and secured to the base member 30 and/or the bar 34 and/or the bracket 31 with the fasteners 35, for reinforcing the bracket 31, another screw or bolt or catch or latch or fastener or lock device 17, such as a quick-release lock device 17 is engaged through the track 10, 11 and the legs 33 and/or the flaps 36 for detachably or removably attaching or mounting or securing the bracket 31 and the base member 30 to the track 10, 11 respectively.

As shown in FIG. 4, the base member 30 includes a longitudinal channel or groove or slot 37, such as a dovetail slot 37 formed therein for attaching or mounting or securing or coupling a soft or resilient cushioning member or pad 38 to the base member 30, for example, the pad 38 includes a longitudinal engaging or anchoring or positioning or retaining or catching member 39, such as a dovetail 39 formed or provided in the lower or bottom portion thereof for slidably or selectively engaging with the slot 37 of the base member 30 and for detachably or removably attaching or mounting or securing the pad 38 to the base member 30 and for softly or resiliently or safely contacting or engaging with the cargo member 90 (FIGS. 5-6).

The retaining device 3 further includes a pivotal member or cover 40 to be pivotally or rotatably attached or mounted or secured or coupled to the base member 30 with a hinge or pivotal coupler 5, for example, the coupler 5 includes two hinge bars or legs or limbs or arms 50, 51 (FIGS. 4-6) attached or mounted or secured to the base member 30 and the cover 40 respectively and pivotally or rotatably secured or coupled together with a pivot axle 52 for allowing the cover 40 to be pivoted or rotated relative to the base member 30, and a spring biasing member 53 is attached or mounted or engaged onto the pivot axle 52 and contacted or engaged with the arms 50, 51 or the base member 30 and the cover 40 respectively for selectively biasing and forcing or moving the cover 40 away from the base member 30 to an open or releasing position as shown in FIG. 6.

The coupler 5 further includes two caps or covers or hoods or casings or housings 54, 55 attached or mounted or secured to the base member 30 and the cover 40 respectively with screws or bolts or catches or latches or fasteners 56 or the like, and engaged onto the arms 50, 51 respectively for covering or shielding or protecting the arms 50, 51 respectively and for preventing the arms 50, 51 from being damaged or rusted by rains or sun shines. The cover 40 also includes a longitudinal channel or groove or slot 41, such as a dovetail slot 41 formed therein for attaching or mounting or securing or coupling another soft or resilient cushioning member or pad 42 to the cover 40, for example, the pad 42 includes a longitudinal engaging or anchoring or positioning or retaining or catching member 43, such as a dovetail 43 formed or provided in the upper portion thereof for slidably or selectively engaging with the slot 41 of the cover 40 and for detachably or removably attaching or mounting or securing the pad 42 to the cover 40 and for softly or resiliently or safely contacting or engaging with the cargo member 90 (FIGS. 5-6), and thus for allowing the cargo member 90 softly or resiliently or safely clamped or anchored or positioned or retained between the base member 30 and the cover 40.

The retaining device 3 further includes a catch or latch or fastener or latch device 6 for openably catching or latching or fastening or locking the base member 30 and the cover 40 together at a closed clamping or working position as shown in FIG. 5. For example, the latch device 6 includes a cover or hood or casing or cap 60 attached or mounted or secured to the cover 40 with screws or bolts or catches or latches or fasteners 61 or the like (FIG. 4), and a securement plate 62 attached or mounted or secured to the cover 40, and/or between the cap 60 and the cover 40, the securement plate 62 includes a catch or latch or lock opening 63 formed therein for forming or defining a catching or latching or locking or anchoring tongue or bar or element 64 below or beneath the lock opening 63 of the securement plate 62.

The latch device 6 further includes an actuating lever 65 having a middle or intermediate portion pivotally or rotatably attached or mounted or secured or coupled to the base member 30 with a pivot shaft 66, and the actuating lever 65 includes a latch bolt or trigger or latch cam or latch element or latch tongue 67 formed or provided at one end portion thereof for selectively engaging with the lock opening 63 and/or the anchoring element 64 of the securement plate 62 of the cover 40 (FIG. 5) and thus for openably catching or latching or fastening or locking the cover 40 to the base member 30, and the actuating lever 65 includes a hand grip 68 formed or provided at the other end portion thereof for being depressed or moved or operated or actuated by the user to actuate or force the latch tongue 67 of the actuating lever 65 to selectively engage with or to be selectively disengaged from the lock opening 63 and/or the anchoring element 64 of the securement plate 62 of the cover 40.

A spring biasing member 70 is attached or mounted or secured or engaged onto the actuating lever 65 or the pivot shaft 66 and contacted or engaged between the base member 30 and the actuating lever 65 for biasing and forcing or moving the latch tongue 67 of the actuating lever 65 to selectively engage with the lock opening 63 and/or the anchoring element 64 of the securement plate 62 of the cover 40 and to openably catch or latch or fasten or lock the cover 40 to the base member 30 at the closed clamping or working position as shown in FIG. 5. The hand grip 68 of the actuating lever 65 is extended or located out of the base member 30 for being depressed or moved or operated or actuated by the user to actuate or force the latch tongue 67 of the actuating lever 65 to selectively disengage from the lock opening 63 and/or the anchoring element 64 of the securement plate 62 of the cover 40.

The latch device 6 further includes a cover or hood or cap or casing 71 attached or mounted or secured to the base member 30 with screws or bolts or catches or latches or fasteners 79 or the like for covering or shielding or protecting the actuating lever 65, and the pivot shaft 66 may be attached or mounted or secured or engaged with the casing 71 and/or the base member 30. The actuating lever 65 includes an opening or recess or depression or notch 69 formed therein, such as formed in the latch tongue 67 of the actuating lever 65. The cap 60 includes a longitudinal opening or channel or slot or passage or groove 72 formed therein for pivotally or rotatably receiving or engaging with a catch or latch or lock element 73, the lock element 73 includes an anchor 74 having a rectangular shape or structure or configuration and having a first or relatively longer side 75 and a second or relatively shorter side 76 (FIG. 4).

For example, the relatively longer first side 75 of the anchor 74 includes a width or length greater than the width of the notch 69 of the actuating lever 65 and may not be moved or engaged through the notch 69 of the actuating lever 65, such that the anchor 74 may not be moved or engaged through the notch 69 of the actuating lever 65 (FIG. 5) when the relatively longer first side 75 of the anchor 74 is disposed or arranged tilted or inclined or perpendicular to or relative to the notch 69 of the actuating lever 65, at this moment, the latch tongue 67 of the actuating lever 65 is confined or anchored or retained or positioned between the securement plate 62 of the cover 40 and the anchor 74 and may not be moved or disengaged from the securement plate 62 of the cover 40, such that the cover 40 may be solidly and stably caught or latched or fastened or locked to the base member 30 at the closed clamping or working position as shown in FIG. 5 with the latch tongue 67 of the actuating lever 65 and the lock element 73. The relatively shorter second side 76 of the anchor 74 includes a width or length less than or no greater than the width of the notch 69 of the actuating lever 65.

On the contrary, when the relatively longer first side 75 of the anchor 74 is disposed or arranged parallel to the notch 69 of the actuating lever 65 and/or when the relatively shorter second side 76 is disposed or aligned with the notch 69 of the actuating lever 65, the anchor 74 may be moved or engaged through the notch 69 of the actuating lever 65 for allowing the actuating lever 65 to be pivoted or rotated relative to the base member 30 and thus for allowing the latch tongue 67 of the actuating lever 65 to be moved or disengaged from the securement plate 62 of the cover 40, and thus for allowing the cover 40 to be moved or pivoted or rotated or disengaged or separated from the base member 30 to the open or releasing position as shown in FIG. 6. The lock element 73 includes an engaging slot or slit 77 formed therein (FIG. 4), such as formed in the outer portion thereof for being engaged with the driving screw driver or tool (not illustrated) and for allowing the lock element 73 and the anchor 74 to be pivoted or rotated relative to the cap 60 and the cover 40 and the actuating lever 65.

Figure 1:
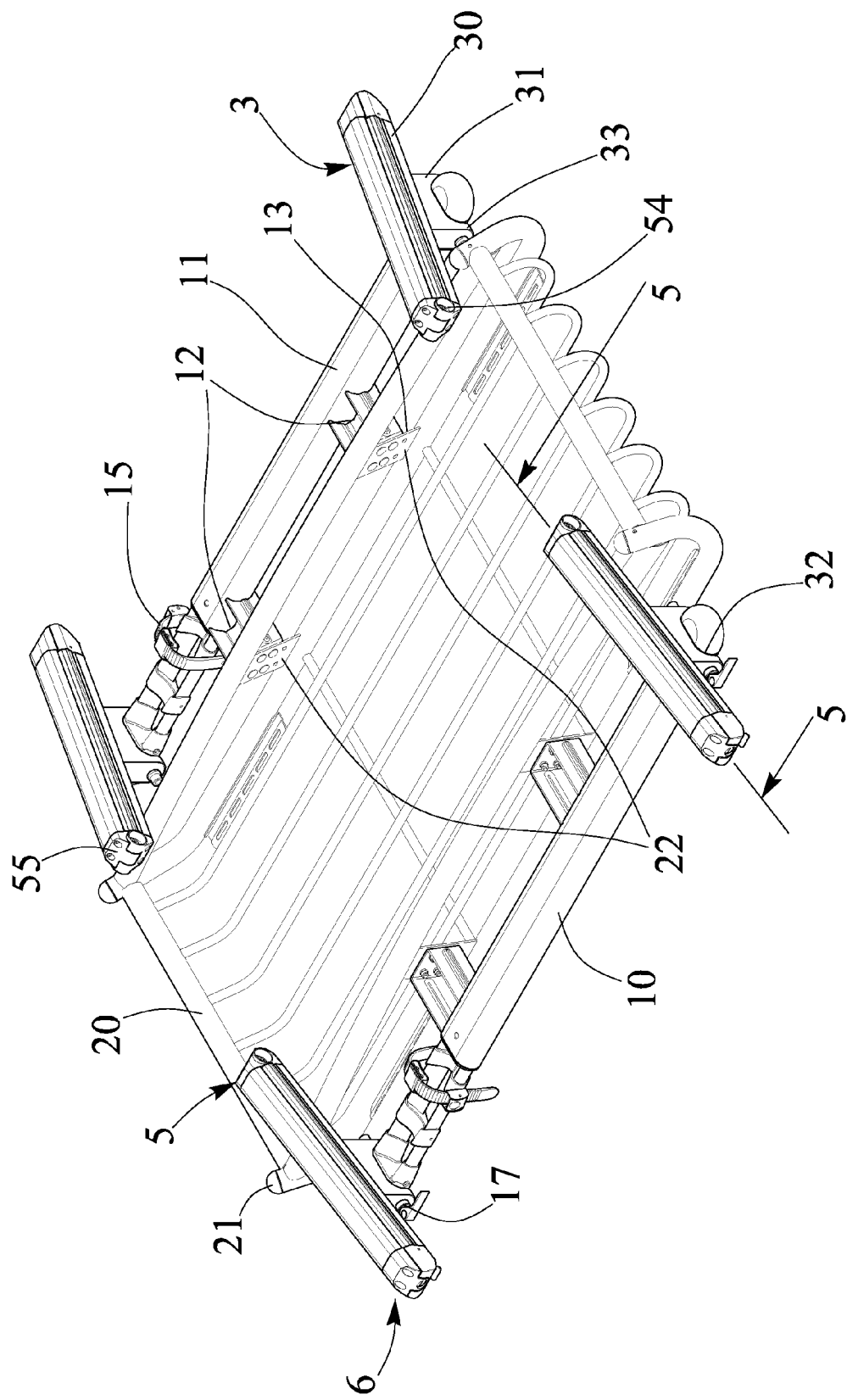
FIG. 1 is a perspective view of a roof-rack mechanism in accordance with the present invention.
Figure 2:
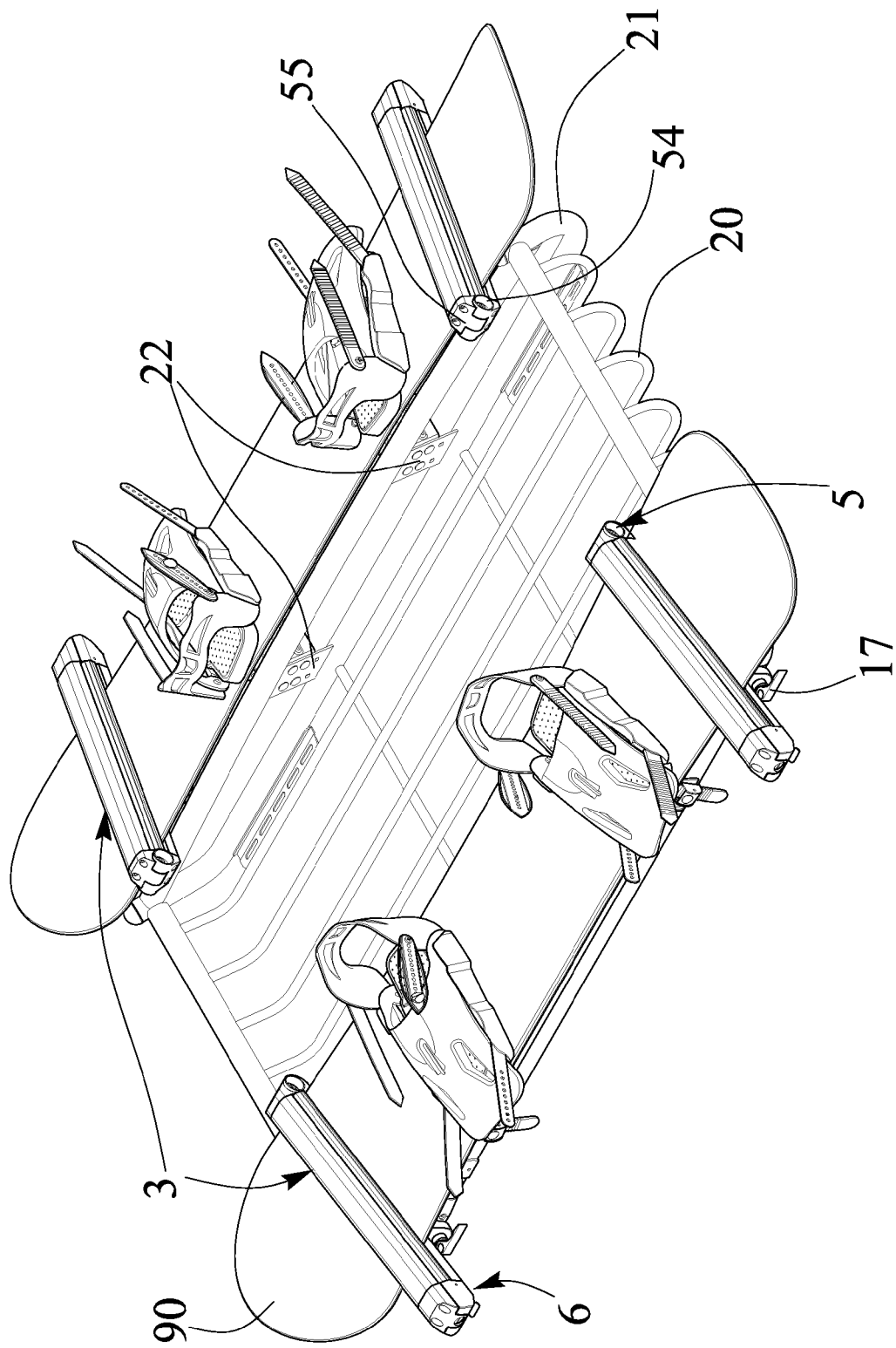
FIG. 2 is another perspective view similar to FIG. 1, illustrating the operation of the roof-rack mechanism.
Figure 3:
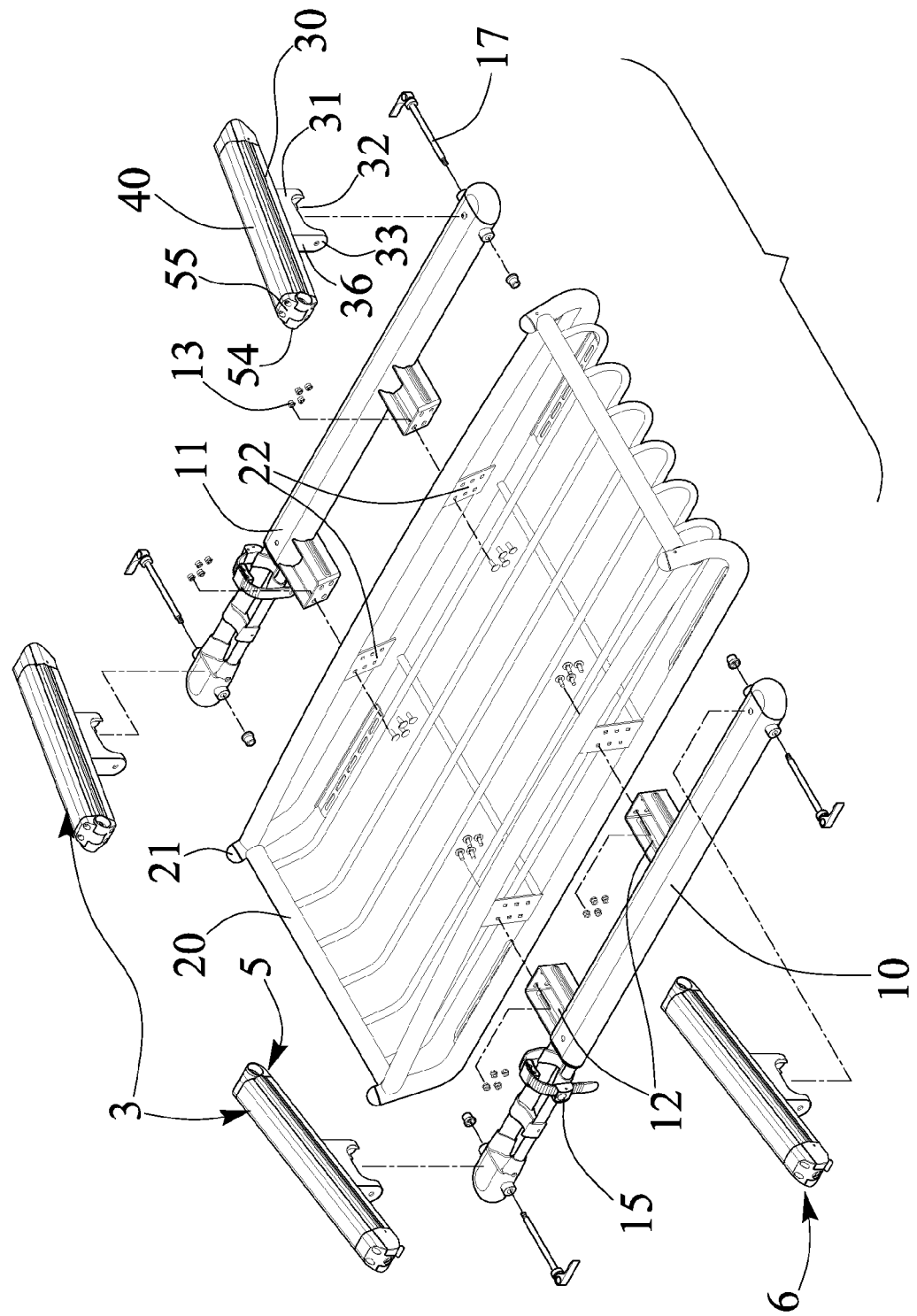
FIG. 3 is a partial exploded view of the roof-rack mechanism.

In operation, as shown in FIGS. 2 and 6, the cover 40 may be selectively moved or pivoted or rotated or disengaged or separated from the base member 30 to the open or releasing position for allowing the cargo member 90 to be disposed or engaged between and softly or resiliently or safely clamped or anchored or positioned or retained between the base member 30 and the cover 40 with the pads 38, 42 when the cover 40 is pivoted or rotated relative to and toward the base member 30, and the latch tongue 67 of the actuating lever 65 may be selectively moved or biased to selectively engage with the lock opening 63 and/or the anchoring element 64 of the securement plate 62 of the cover 40, and thus to selectively catch or latch or fasten or lock the base member 30 and the cover 40 together at the closed clamping or working position as shown in FIG. 5, and thus to allow the cargo member 90 to be softly or resiliently or safely clamped or anchored or positioned or retained between the base member 30 and the cover 40.

As shown in FIGS. 7-10, the roof-rack mechanism may further comprise one or more (such as two) further clamping or anchoring or positioning or carrying or retaining devices 300 selectively or alternatively attached or mounted or secured to the track 10, 11 instead of the retaining devices 3 that shown in FIGS. 1-6, and each retaining device 300 include an L-shaped base member or bracket 301 which includes one or more (such as two) flaps or plates or bars of strips or panels or angles or flaps 36 extended downwardly therefrom and detachably or removably attached or mounted or secured to the track 10, 11 with the screw or bolt or catch or latch or fastener or lock device 17, such as the quick-release lock device 17, and the retaining devices 300 each include a curved seat 381 for suitably and selectively engaging with the cargo member 91, and a soft or resilient engaging belt 401 attached or mounted or secured to the bracket 301 for softly or resiliently or safely contacting or engaging with the cargo member 91.

Accordingly, the roof-rack mechanism in accordance with the present invention includes an improved structure or configuration for solidly and stably and safely attaching or mounting or securing or supporting various objects or loads onto the roof of the automobile vehicle or the like and for preventing the objects or loads from being hurt or damaged when carried with the automobile vehicle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A roof-rack mechanism comprising:
at least one track,
at least one retaining device attached to said at least one track, said at least one retaining device including a base member, and a bracket attached to said base member and mounted on said at least one track, said bracket including a recess formed between two legs for engaging with said at least one track, and
a lock device engaged with said at least one track and said legs of said bracket of said at least one retaining device for detachably attaching said at least one retaining device to said at least one track.

2. The roof-rack mechanism as claimed in claim 1, wherein said at least one retaining device includes two flaps engaged onto said legs of said bracket and secured to said legs and said at least one track with said lock device.

3. The roof-rack mechanism as claimed in claim 1, wherein said at least one retaining device includes a bar engaged between said base member and said bracket.

4. The roof-rack mechanism as claimed in claim 1, wherein said at least one track includes at least one fastening strap.

5. The roof-rack mechanism as claimed in claim 1, wherein said at least one retaining device includes an L-shaped bracket detachably attached to said at least one track with said lock device, and an engaging belt attached to said L-shaped bracket.

6. A roof-rack mechanism comprising:
at least one track,
at least one retaining device attached to said at least one track, said at least one retaining device including a base member, and a bracket attached to said base member and mounted on said at least one track, and
a lock device engaged with said at least one track and said at least one retaining device for detachably attaching said at least one retaining device to said at least one track, wherein
said at least one retaining device includes a cover pivotally attached to said base member with a coupler.

7. The roof-rack mechanism as claimed in claim 6, wherein said coupler includes two arms attached to said base member and said cover respectively and pivotally coupled together with a pivot axle for allowing said cover to be rotated relative to said base member.

8. The roof-rack mechanism as claimed in claim 7, wherein said coupler includes a spring biasing member engaged onto said pivot axle and engaged with said arms for biasing said cover away from said base member.

9. The roof-rack mechanism as claimed in claim 7, wherein said coupler includes two housings attached to said base member and said cover and engaged onto said arms for shielding said arms respectively.

10. The roof-rack mechanism as claimed in claim 6, wherein said at least one retaining device includes a latch device for latching said base member and said cover together at a working position.

11. The roof-rack mechanism as claimed in claim 10, wherein said latch device includes a securement plate attached to said cover, and an actuating lever pivotally secured to said base member with a pivot shaft, and said actuating lever includes a latch tongue for selectively engaging with said securement plate of said cover and for locking said cover to said base member.

12. The roof-rack mechanism as claimed in claim 11, wherein said actuating lever includes a hand grip for moving said latch tongue of said actuating lever from said securement plate of said cover.

13. The roof-rack mechanism as claimed in claim 11, wherein said securement plate includes a lock opening formed therein and defined by an anchoring element for selectively engaging with said latch tongue of said actuating lever.

14. The roof-rack mechanism as claimed in claim 11, wherein said latch device includes a cap attached to said securement plate and said cover, and a lock element rotatably engaged in said cap for engaging with said actuating lever and for locking said latch tongue of said actuating lever in engagement with said securement plate of said cover.

15. The roof-rack mechanism as claimed in claim 14, wherein said actuating lever includes a notch formed therein, and said lock element includes an anchor having a first side and a second side, said first side of said anchor includes a length greater than a width of said notch of said actuating lever for preventing said anchor from engaging through said notch of said actuating lever, and said second side of said anchor includes a length no greater than said width of said notch of said actuating lever for allowing said anchor to be engaged through said notch of said actuating lever.

16. The roof-rack mechanism as claimed in claim 14, wherein said lock element includes an engaging slit formed therein.

17. The roof-rack mechanism as claimed in claim 11, wherein said latch device includes a casing attached to said base member for shielding said actuating lever.

18. The roof-rack mechanism as claimed in claim 11, wherein said latch device includes a spring biasing member attached onto said pivot shaft and engaged between said base member and said actuating lever for biasing said latch tongue of said actuating lever to engage with said securement plate of said cover.

* * * * *